(12) United States Patent
Bhogal et al.

(10) Patent No.: US 6,931,556 B2
(45) Date of Patent: Aug. 16, 2005

(54) BACKGROUND TRANSFER OF OPTICAL DISK TO HARD DISK

(75) Inventors: Kulvir Singh Bhogal, Fort Worth, TX (US); Nizam Ishmael, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 10/047,010

(22) Filed: Jan. 16, 2002

(65) Prior Publication Data

US 2003/0135770 A1 Jul. 17, 2003

(51) Int. Cl.$^7$ .................................................. G06F 1/32
(52) U.S. Cl. ....................... 713/320; 713/300; 713/323; 713/324; 713/330; 709/217; 709/219; 707/1; 707/10; 707/100; 707/104.1; 707/203; 707/205; 700/90; 700/91; 700/94
(58) Field of Search .................................. 713/300, 320, 713/323, 324, 330; 709/217, 219; 707/1, 10, 100, 104.1, 203, 205; 700/90, 91, 94

(56) References Cited

U.S. PATENT DOCUMENTS

| | | | | |
|---|---|---|---|---|
| 5,642,497 A | * | 6/1997 | Crary et al. ................... 703/23 |
| 5,811,706 A | | 9/1998 | Van Buzkirk et al. | |
| 5,841,979 A | | 11/1998 | Schulhof et al. | |
| 5,892,764 A | | 4/1999 | Riemann et al. | |
| 5,914,941 A | | 6/1999 | Janky | |
| 5,964,878 A | * | 10/1999 | Ryu ........................... 713/323 |
| 6,119,153 A | | 9/2000 | Dujari et al. | |
| 6,181,867 B1 | * | 1/2001 | Kenner et al. ................. 386/46 |
| 6,212,555 B1 | | 4/2001 | Brooks, Jr. et al. | |
| 6,385,152 B1 | * | 5/2002 | Fujinami et al. ............ 369/53.2 |
| 6,542,870 B1 | * | 4/2003 | Matsumoto ..................... 705/1 |
| 6,647,499 B1 | * | 11/2003 | Morcom ...................... 713/300 |
| 6,694,200 B1 | * | 2/2004 | Naim ............................. 700/94 |
| 6,711,343 B1 | * | 3/2004 | Matsumi et al. ................ 386/46 |
| 6,747,933 B2 | * | 6/2004 | Ueki ......................... 369/53.31 |
| 6,791,481 B2 | * | 9/2004 | Altare et al. ................... 341/55 |
| 2002/0071652 A1 | * | 6/2002 | Ohnishi ........................ 386/46 |
| 2002/0194356 A1 | * | 12/2002 | Chan et al. .................. 709/231 |
| 2003/0101383 A1 | * | 5/2003 | Carlson ........................ 714/42 |

FOREIGN PATENT DOCUMENTS

| | | | | |
|---|---|---|---|---|
| JP | 2000259481 A | * | 9/2000 | ........... G06F/12/00 |
| JP | 2001101039 A | * | 4/2001 | ........... G06F/12/00 |

* cited by examiner

Primary Examiner—Lynne H. Browne
Assistant Examiner—Nitin C. Patel
(74) Attorney, Agent, or Firm—Mark S. Walker; Jeffrey L. Streets; Frank J. Campigotto

(57) ABSTRACT

The present invention provides a method for reducing the amount of power consumed by an optical disk player. The method provides: recording at least a portion of the audio, video, or audio/video data from an optical disk onto the portable computer's hard disk while the optical disk is being played over the output device; turning the drive's spin motor off as soon as the data has been transferred to the hard disk; and then continuing to play the remaining un-played portion of the optical disk over the portable computer's speaker or other output device from the hard disk. The method further comprises recording in an index database a title of the optical disk and a title of the track written to the hard disk, and playing the data from the hard disk without re-reading the optical disk if the data has been previously written to the hard disk.

30 Claims, 4 Drawing Sheets

US 6,931,556 B2

BACKGROUND TRANSFER OF OPTICAL DISK TO HARD DISK

BACKGROUND OF THE INVENTION

1. Field of the Invention

The present invention provides a method, computer program product and apparatus for conserving power on a mobile computer, portable audio CD player or other similar device.

2. Description of the Related Art

Notebook computers, handheld computers, and other similar electronic devices and their peripherals, have become quite popular due to their lightweight and highly portable character. Business people, students and tourists carry these portable computers on business trips, vacations and to other similar destinations, such as to meetings, libraries and classrooms, because the computers allow them to carry important data and applications with them. The computers can also provide them with access to a global information network, such as the Internet. These portable computers often include DVD players, CD-ROM drives, or other optical disk drives that may be used to load data or to play audio or video CD's. The use of the CD-ROM drive for playing music is especially popular.

However, when using a CD-ROM drive to play music or other audio video/performances, the spin motor consumes an inordinate amount of power, significantly shortening the time period over which the computer battery will support the computer between re-charge cycles. This can be quite frustrating to computer users who cannot listen to their audio CD's because they are not in a situation that allows them to use a power outlet. Equally frustrating perhaps, is the discovery that the battery becomes exhausted during use.

Battery power limitations are a well-known fact in the portable computer and electronics world and many efforts have been directed to the issue. Power management application programs have been developed that dim the visual display during those periods that the computer is running on battery power, that toggle the processor to run at a slower speed, that disable secondary RAM caches and that turn off peripheral devices that are not being used, such as the hard disk. Battery designs and materials have also been developed that deliver electrical current over a longer time period. While these developments have been somewhat successful in lengthening the amount of time that a portable computer may run on battery power before depleting the battery, portable computer users must often limit what they do with their computers, such as refraining from listening to an audio CD because of the power drain created by the CD-ROM drive. For example, a typical battery for a portable computer may operate from three to five hours before re-charging is required. However, with the CD-ROM operating, battery life before requiring re-charge is shortened by about thirty to fifty percent.

What is needed is a simple method for operating CD-Rom drives that will use less battery resources. It would be desirable if the method did not reduce performance of the CD-ROM or require users to change the manner in which they use their CD-ROM.

SUMMARY OF THE INVENTION

The present invention provides a method, computer program product and apparatus for conserving power on a mobile computer, portable audio CD player or other similar devices. The method comprises receiving an instruction to read audio, video or audio/video data from an optical disk within the optical disk player, wherein the data is to be provided to an output means at a known playback rate and then reading the data from the optical disk at a rate that is greater than the known playback rate. The data is stored on a hard disk while also being provided to an output means at the known playback rate while the data is being stored. The optical disk player is turned off as soon as the data has been stored although the data is still continued to be provided to the output means at the known playback rate by retrieving the stored data from the hard disk. When the optical disk player is turned off, the spin motor within the optical disk player is also turned off, thereby decreasing a significant amount of power consumption.

The data is selected from all the data on the optical disk or a track of the data on the optical disk, wherein the beginning of each track is identified in a table of contents for the optical disk. The output means is selected from a speaker, a set of speakers, a video display or combinations thereof. The data may be converted to a different computer readable format before storing the data on the hard disk. The format may be any sound compression format that reduces the memory space required to store the data on the hard disk, such as, for example, MP3, WMA, WAV, Ogg, VQF or AAC.

The method further comprises recording in an index database information selected from a title of the optical disk, a title of the track written to the hard disk, or combinations thereof; comparing the title of the optical disk and the title of track with other titles previously recorded in the index; determining whether the optical disk and the track has previously been written to the hard disk; and playing the data from the hard disk without re-reading the optical disk if the data has been previously written to the hard disk. Other information that may be recorded in the index database includes artist of the track, artist of the optical disk, date the file was last played from the hard disk, or combinations thereof. This information may then be arranged in groups selected from alphabetically by artist, alphabetically by titles, or by date the file was last accessed.

The method further comprises searching the hard disk for presence of the data; and playing the data from the hard disk without re-reading the optical disk. Finally, the method comprises designating in an index database that a first file is to be permanently stored on the hard disk; and then erasing automatically from the hard disk a second file not played for a designated set period of time and not designated in the index database that the second file is to be permanently stored on the hard disk, wherein the first and second files contain the data stored on the hard disk at different times.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
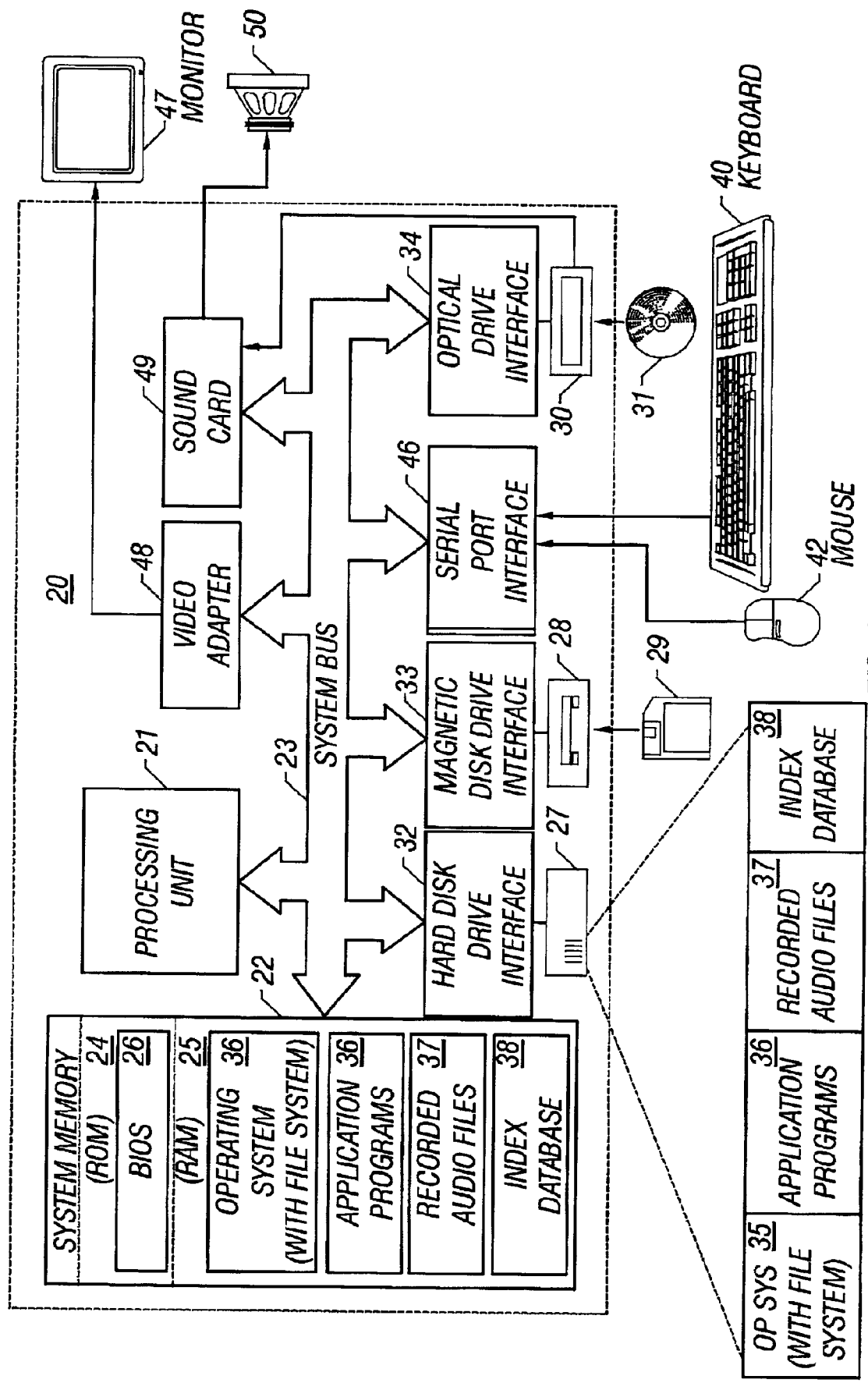
FIG. 1 is a schematic diagram of a system that may be used to implement the present invention.

The present invention provides a method for reducing the amount of power consumed by an optical disk player when it is being used to play audio and/or video data to an output device. Accordingly, the invention has the advantage of increasing the period of time that a portable computer, portable audio CD player, DVD player or other similar device may be operated by battery without requiring that the battery be recharged or replaced. The method provides: recording at least a portion of the audio, video, or audio/video data from an optical disk onto the portable computer's hard disk while the optical disk or a designated portion is being played over the portable computer's speaker or other output device; turning the spin motor of the optical disk drive off as soon as the optical disk or the designated portion has been transferred to the hard disk; and then continuing to play the remaining un-played portion of the optical disk over the portable computer's speaker or other output device from the hard disk. Alternatively, the optical disk may first start recording to the hard drive for a short time period before any data is played over the speaker or other output device. Then, after this short time period, the data may start to be played to the speaker or other output device from the hard drive while the remaining data continues to be recorded to the hard disk. The designated portion of the optical disk may be, for example, a song track from an audio CD.

When a CD-ROM, audio CD or other form of optical disk is inserted into the CD-ROM player or other optical disk drive, the computer processor or optical disk drive controller causes the CD-ROM to be rotationally driven at a constant linear velocity and the table of contents for the CD-ROM is read from the CD-ROM and stored in RAM. The table of contents (TOC) provides the computer with the location of data, such as audio files or audio tracks, on the CD-ROM so that the computer processor may supervise the playback position in the data area. The computer processor then waits to receive a playback start command from the keyboard or other applicable device. When the playback key of the keyboard is activated to provide the start command, the computer processor causes the spindle motor to be rotationally driven at the constant linear velocity for rotationally driving the CD-ROM disc. At the same time, the computer processor causes the optical head to track to a location according to the TOC data stored in the RAM to a position of the CD-ROM disc where the designated audio file is recorded.

In the case of an audio CD inserted into the CD-ROM drive, often there is a connection between the CD-ROM drive and the sound card enabling the drivers of the CD-ROM drive and sound card to coordinate the playing of a sound file between themselves without involving the computer's CPU, thereby unloading processing requirements from the CPU. However, the CD-ROM drive is connected through an optical drive interface to the system bus and is therefore in communication with the computer's CPU when necessary.

The spin motor of the optical disk drive consumes a large amount of power, creating a significant drain on the battery of a laptop computer whenever the optical disk drive is being operated. A typical battery for a laptop computer may normally power the computer for about three to five hours before recharging is required if the optical disk drive is not operating. When the optical disk drive is operating, the time period before the battery must be recharged drops to about 1.5 to 2.5 hours. This drop in power availability becomes quite frustrating for those users wishing to listen to an audio CD while working on their computer.

It should be noted that while most of the following discussion involves audio CD's, the present invention is not limited to audio CD's only but is applicable to any portable device having an optical disk drive playing through an output device such as speakers and/or a video display.

The present invention allows the audio CD or a designated portion to be simultaneously recorded to the computer's hard disk while the audio CD is being played over the computer's speaker. Then, when the audio CD or the designated portion has been fully recorded to the computer's hard disk, the computer begins playing the audio file from the hard disk and shuts off the spin motor of the optical disk drive, thereby conserving power and significantly increasing the time period the computer may be used before having to recharge the battery. Before the computer begins playing the audio file from the hard disk, the computer processor must first reference the location in the audio file being played from the optical disk with the stored file on the hard drive. This may be accomplished, for example, by adding markers into the file copied onto the hard disk referenced with locations on the optical disk. Then, when a location on the optical disk is reached while the optical disk is playing, the computer processor knows the same exact location of the file on the hard disk and transfer of the playing through the output device between the optical disk drive and the hard disk drive will appear to be seamless to the user.

A typical audio CD takes about 75 minutes to play. However, the entire CD may be transferred to the hard disk in a fraction of that time, depending upon the speed of the player, thereby significantly decreasing the amount of time that the spin motor must operate while still allowing the user to listen to the audio files as desired.

While the audio CD is playing over the speaker, an application program executed by the computer's processor instructs the optical disk scanner to write the audio files to the hard disk. Optionally, the processor may convert these files before being written to the hard disk to MP3, WMA, WAV, AAC, Ogg Vorbis or other audio file format to minimize the space required to store the files on the hard disk. If the audio CD and each of its tracks is labeled, then the computer may store the CD identity and track identity in an Index database for later identification and retrieval. Alternatively, the user may manually enter the CD title and track name if the information is not recorded on the audio CD.

The application program may also contain a Graphical User Interface (GUI) providing different options available to the user. For example, the user may access the Index database to review the audio files that had previously been copied and stored on the hard disk and then select a file to play without first inserting an audio CD. Also, the user may review the audio files and select those files the user wishes to maintain in a "permanent" library of audio files on the computer's hard disk. Those audio files on the hard disk not designated as being in the permanent library are in a temporary library. The user may also designate a time period after which audio files that have not been played in the designated time period, and not stored in the permanent library, are purged automatically from the hard disk. Optionally, while a song is being played from an audio CD, the user may, from the GUI, instruct that the file being played be stored in the permanent library.

The Index database may contain the name of the audio CDs that have been played and the names of audio files associated with each audio CD, a flag indicating whether the audio file is to be stored in the permanent audio file library, the date the file was last accessed, and other information that may be of interest to the user, such as artist, date of the recording and other such information. Using the GUI, the user may sort the Index alphabetically by artist, alphabetically by titles, by the date on which an audio file was last accessed, or by other stored characteristics.

Optionally, the present invention provides a method for preferentially playing an audio file from the hard disk rather than from an audio CD. In this embodiment, when an audio CD is inserted into the optical disk drive, the processor first identifies the CD and checks to determine if the audio CD has previously been recorded onto the hard disk. If the audio CD has been previously recorded, then the computer preferentially plays the audio file recorded on the hard disk rather than from the inserted audio CD, thereby reducing the power drawn from the battery.

Furthermore, the present invention may be implemented on a portable CD player, DVD player, or other similar portable optical disk player having a hard disk memory device and a controller, and preferably also a video display for the user to select options and provide instructions to the controller. In this embodiment, the CD player may record audio files to a hard disk exactly as the computer would do in the embodiments above. Because the spin motor on a CD player also consumes an inordinate amount of power, by having a hard disk with stored audio files, the period of time that the portable CD player could play without having to replace or recharge the batteries would be significantly increased.

FIG. 1 is a schematic diagram of an exemplary system on which the present invention may be implemented. FIG. 1 shows a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 may further include a hard disk drive 27 for reading from and writing to a hard disk platter, not shown, a magnetic disk drive 28 for reading from or writing to a removable magnetic disk 29, and an optical disk drive 30 for reading from or writing to a removable optical disk 31 such as a CD-ROM, audio CD or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the system.

A number of program modules may be stored on the hard disk, magnetic disk 29, optical disk 31, ROM 24 or RAM 25, including an operating system 35, (including a file system therein and/or associated therewith), one or more application programs 36, recorded audio files 37 and an Index database 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB).

A monitor 47 or other type of display device is also connected to the system bus 23 via an interface, such as a video adapter 48. A sound card 49 is also connected to the system bus with output directed to a speaker 50. A separate direct connection, bypassing the system bus 23, may also be made between the optical disk drive 30 and the sound card 49 for playing audio CD's.

Figure 2:
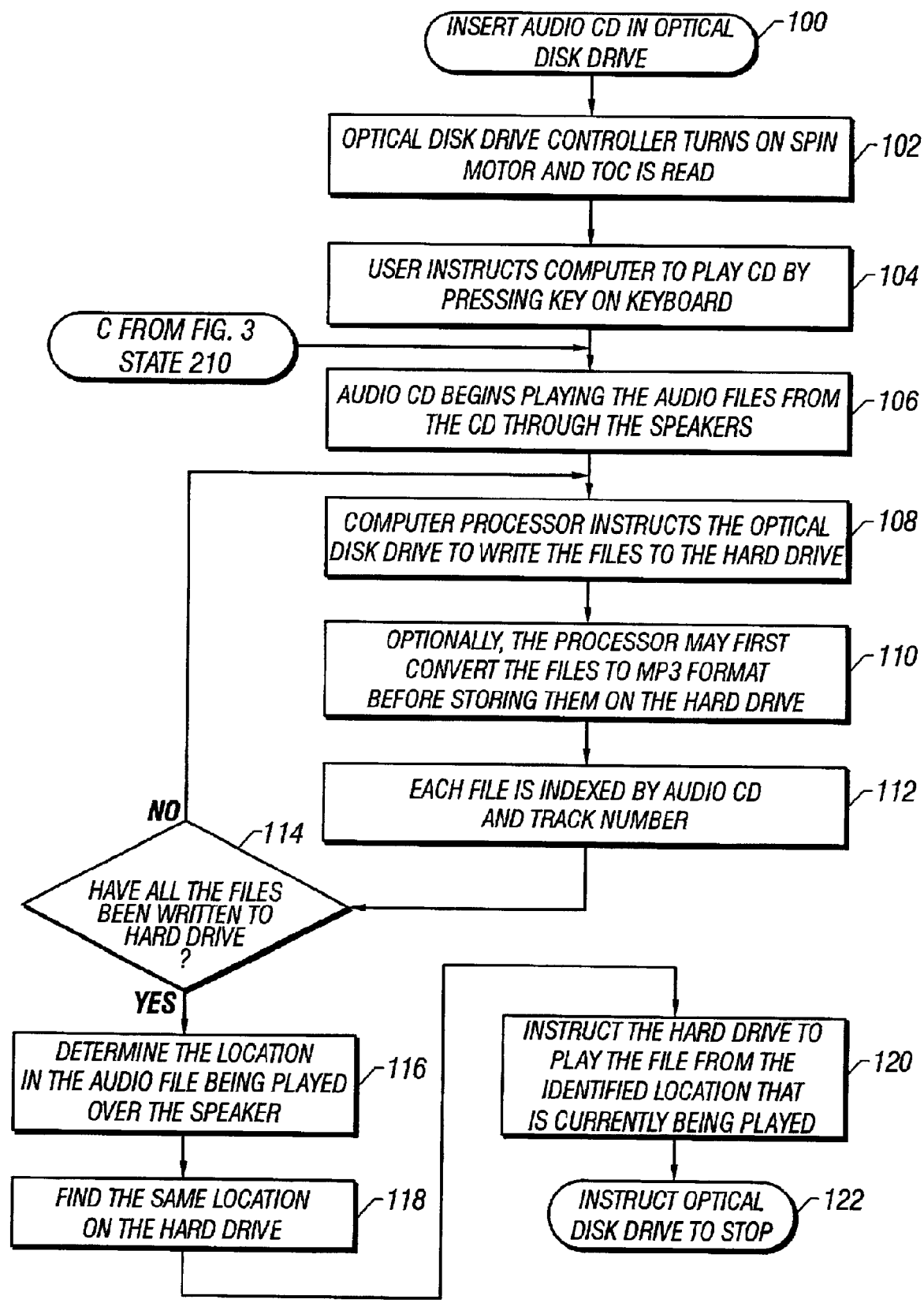
FIG. 2 is a flow diagram of a method for playing an audio CD and recording the audio CD onto a computer's hard disk in accordance with the present invention.

FIG. 2 is a flow diagram of a method for playing an audio CD and recording the audio CD onto a computer's hard disk in accordance with the present invention. This method may be implemented on the system shown in FIG. 1. In state 100, an audio CD is inserted into the optical disk drive. In state 102, the optical disk controller turns on the spin motor and reads the table of contents (TOC) for the audio CD. In state 104, the user instructs the computer to play at least a portion of the audio CD by providing a command through an input device, such as by pressing a designated key on the keyboard. In state 106, the optical disk drive begins playing the audio file from the audio CD through the computer's speakers, whether the optical disk drive is communicating directly with the sound card or communicating through the system bus. In state 108, the computer processor instructs the optical disk drive to write the files to the hard disk. In optional state 110, the processor converts the files to MP3 format before storing the files on the hard disk. In state 112, each stored audio file is indexed by audio CD title and track number in an Index database. In state 114, it is determined whether all of the desired files have been written to the hard disk. If the desired file or files have not been written to the hard disk, then the method returns to states 108 through 112. If, in state 114, all the desired audio files on the audio CD have been written to the hard disk, then in state 116, the processor determines the location in the audio file that is currently being played through the computer's speaker. In state 118, the processor identifies the location in the audio file stored on the hard disk that corresponds with the location in the audio file that is being performed. In state 120, the processor then instructs the system to play the audio file from the identified location on the hard disk instead of the audio CD. In state 122, the computer processor instructs the optical disk drive to stop, thereby conserving power, yet allowing the audio performance to continue.

Figure 3:
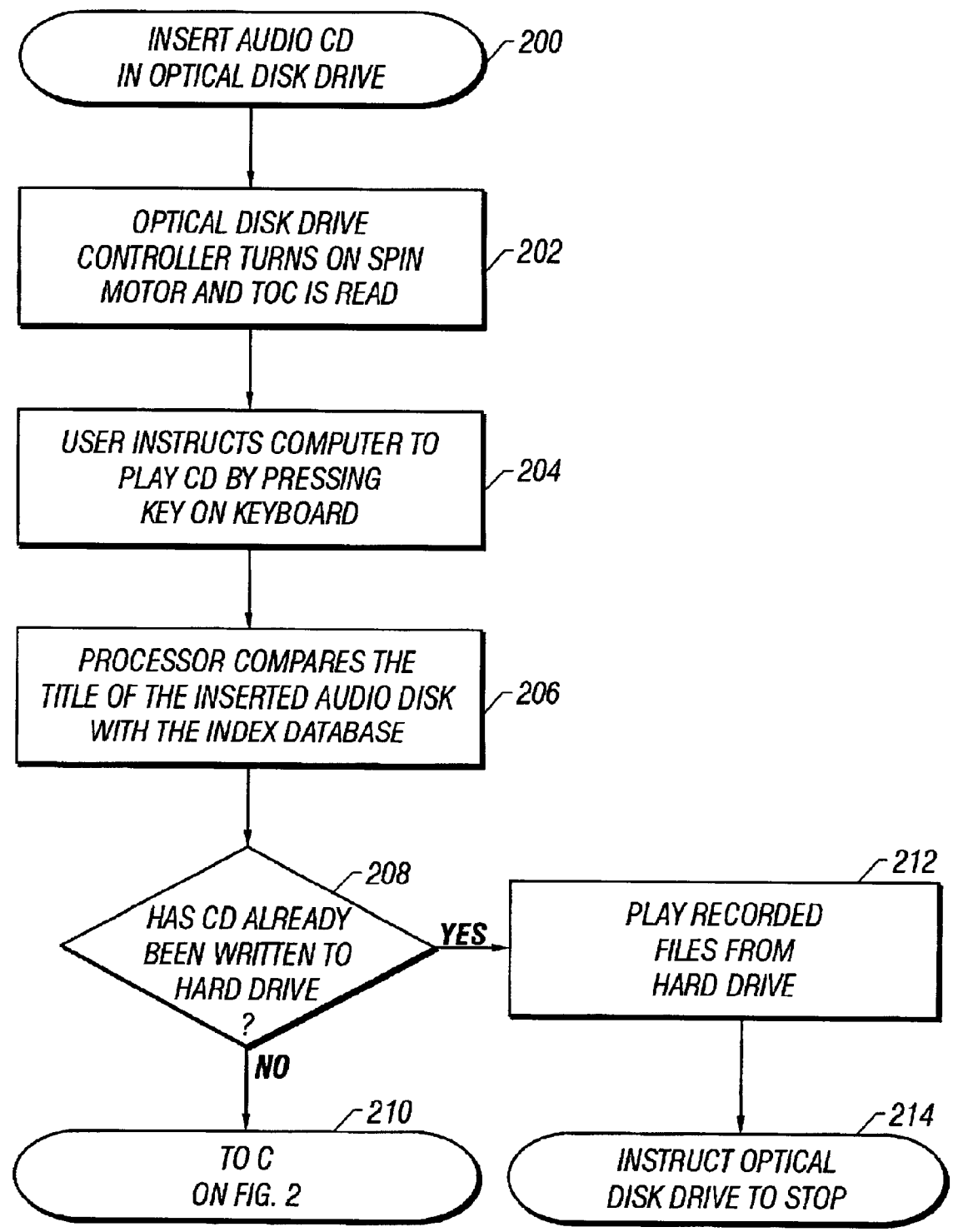
FIG. 3 is a flow diagram of a method for preferentially playing an audio file from the hard disk in accordance with the present invention.

FIG. 3 is a flow diagram of a method for preferentially playing an audio file from the hard disk in accordance with the present invention. This method maybe implemented on the system shown in FIG. 1. In state 200, an audio CD is inserted into the optical disk drive. In state 202, the optical disk controller turns on the spin motor and reads the table of contents (TOC) for the audio CD. In state 204, the user instructs the computer to play the audio CD by pressing a designated key on the keyboard. In state 206, the computer processor compares the title of the inserted audio CD with the titles listed in the Index database. If, in state 208, the inserted audio CD does not appear in the Index database as already having been written to the hard disk, then in state 210, the method continues to locator C on FIG. 2 to continue with the method shown therein. If, in state 208, the inserted audio CD does appear in the Index database as already having been written to the hard disk, then in state 212, the processor instructs the hard disk to play the audio files as stored on the hard disk. In state 214, the processor then instructs the optical disk drive to stop spinning, thereby conserving power.

Figure 4:
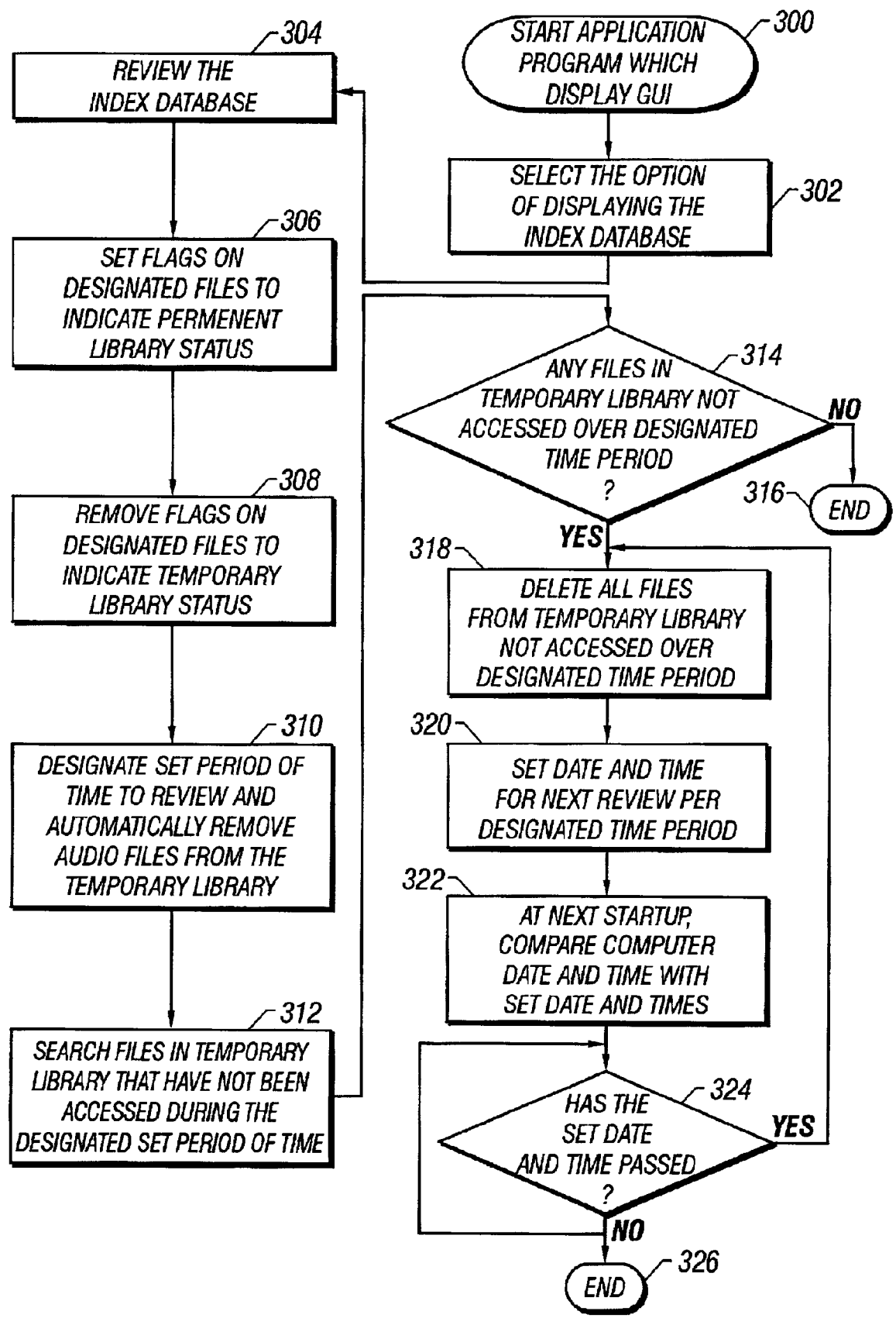
FIG. 4 is flow diagram of a method for maintaining a library of audio files on the hard disk in accordance with the present invention

FIG. 4 is flow diagram of a method for maintaining a library of audio files on the hard disk in accordance with the present invention. This method may be implemented on the system shown in FIG. 1. In state 300, an application program is started which displays a Graphical User Interface (GUI). In state 302, the user selects from the choices displayed on the GUI, the option of displaying the Index database containing the list of audio CDs and the tracks from the audio CDs that have been recorded onto the hard disk. In state 304, the user reviews the list of both temporary and permanent library files and, if desired, in state 306, the user may set flags on designated audio files to indicate permanent library status. In state 308, the user may remove flags to change the status of audio files to temporary library status if desired. From the GUI, in state 310, the user may also designate a set period of time that, if an audio file in the temporary audio library has not been accessed within the designated set period of time, then the processor automatically purges those audio files from the temporary library. In state 312, the processor searches for any audio file in the temporary library that has not been accessed during the designated set period of time. If, in state 314, there are no audio files in the temporary library that have not been accessed during the designated set period of time, then in state 316, the method ends. If, in state 314, there are audio files that have not been accessed during the designated set period of time, then in state 318, the processor purges all the files not accessed during the designated set period of time. The user may be notified of purging immediately before it occurs. At this point the user can be given the autonomy of stopping the purge of a specific file that is "due" for purging. In state 320, the processor sets and records the date and time for the next review per the designated set period of time. The date and time for the next review may be determined by adding the designated set period of time to the current system date and time. Alternatively, the date and time for the next review may be determined by adding the designated set period of time to the earliest date and time of access of any of the files remaining in the temporary library. Then, in state 322, upon the next startup of the application program, the processor will compare the system date and time with the date and time recorded in state 320. If, in state 324, the system date and time is later than the date and time recorded in state 320, then the method returns to state 318 through state 320 as discussed above. If, in state 324, the system date and time is not later than the date and time recorded in state 320, then in state 326, the method ends.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A method of operating an optical disk player comprising:
   receiving an instruction to read audio, video or audio/video data from an optical disk within the optical disk player, wherein the data is to be provided to an output means at a known playback rate;
   reading the data from the optical disk at a rate that is greater than the known playback rate;
   recording in an index database information parameters selected from a title of the optical disk, a title of a track of the data written to the bard disk, or combinations thereof;
   comparing the information parameters of the data with information parameters of data previously recorded in the index;
   determining whether the optical disk or the track has previously been written to the hard disk;
   playing the data from the hard disk without re-reading the optical disk if the data has been previously written to the hard disk and turning oil the optical disk player;
   storing the data on a hard disk as the data is being read if the data was not previously stored on the hard disk;
   providing the data to the output means at the known playback rate while the data is being stored;
   turning off the optical disk player as soon as the data has been read and stored; and then
   continuing to provide the data to the output means at the known playback rate by retrieving the data stored on the hard disk.

2. The method of claim 1, wherein the step of turning off the optical disk player includes turning off a spin motor within the optical disk player.

3. The method of claim 1, wherein the data is selected from all the data on the optical disk or a track of the data on the optical disk, wherein the beginning of each track is identified in a table of contents for the optical disk.

4. The method of claim 1, wherein the output means is selected from a speaker, a set of speakers, a video display or combinations thereof.

5. The method of claim 1, further comprising:
   converting the data to a different computer readable format before storing the data on the hard disk.

6. The method of claim 5, wherein the format is selected from MP3, WMA, WAV, Ogg, VQF or AAC.

7. The method of claim 5, wherein the format is any format that reduces the memory space required to store the data on the hard disk.

8. The method of claim 1, further comprising:
   recording information parameters in the index database selected from artist of the truck, artist of the optical disk, date the file was last played from the bard disk, or combinations thereof; and
   arranging data in the index database, wherein the data is arranged in groups selected from alphabetically by artist, alphabetically by titles, or by date the file was last accessed.

9. The method of claim 1, further comprising:
   searching the hard disk for presence of the data; and
   playing the data from the hard disk without re-reading the optical disk.

10. The method of claim 1, further comprising:
    designating in an index database that a first file is to be permanently stored on the hard disk; and
    erasing automatically from the hard disk a second file not played for a designated set period of time and not designated in the index database that the second file is to be permanently stored on the hard disk, wherein the first and second files contain the data stored on the hard disk at different times.

11. A computer program product comprising:
    receiving instructions for receiving an instruction to read audio, video or audio/video data from an optical disk within an optical disk player, wherein the data is to be provided to an-output means at a known playback rate;
    reading instructions for reading the data from the optical disk at a rate that is greater than the known playback rate;
    recording instructions for recording in an index database information parameters selected from a title of the optical disk, a title of a track of the data written to the hard disk, or combinations thereof;
    comparing instructions for comparing the information parameters of the data with information parameters of data previously recorded in the index;
    determine instructions for determining whether the optical disk or the track has previously been written to the hard disk;

playing instructions for playing the data from the hard disk without re-reading the optical disk if the data has been previously written to the hard disk and turning off the optical disk player;

storing instructions for storing the data on a hard disk as the data is being read if the data was not previously stored on the hard disk;

providing instructions for providing the data to output means at the known playback rate while the data is being stored;

turning off instructions for turning off the optical disk player as soon as the data has been stored; and then continuing instructions for continuing to provide the data to the output means at the known playback rate by retrieving the stored data.

12. The computer program product of claim 11, wherein the step of turning off the optical disk player includes turning off a spin motor within the optical disk player.

13. The computer program product of claim 11, wherein the data is selected from all the data on the optical disk or a track of the data on the optical disk, wherein the beginning of each track is identified in a table of contents for the optical disk.

14. The computer program product of claim 11, wherein the output means is selected from a speaker, a set of speakers, a video display or combinations thereof.

15. The computer program product of claim 11, further comprising:
converting instructions for converting the data to a different computer readable format before storing the data on the hard disk.

16. The computer program product of claim 15, wherein the format is selected from MP3, WMA, WAX, Ogg, VQF or AAC.

17. The computer program product of claim 15, wherein the format is any format that reduces the memory space required to store the data on the hard disk.

18. The computer program product of claim 11, further comprising:
recording instructions for recording information parameters in the index database selected from artist of the track, artist of the optical disk, date the file was last played from the hard disk, or combinations thereof; and
arranging data in the index database, wherein the data is arranged in groups selected from alphabetically by artist, alphabetically by titles, or by date the file was last accessed.

19. The computer program product of claim 11, further comprising:
searching instructions for searching the hard disk for presence of the data; and
playing instructions for playing the data from the hard disk without re-reading the optical disk.

20. The computer program product of claim 12, further comprising:
designating instructions for designating in an index database that a first file is to be permanently stored on the hard disk; end
erasing instructions for erasing automatically from the hard disk a second file not played for a designated set period of time and not designated in the index database that the second file is to be permanently stored on the hard disk, wherein the first and second files contain the data stored on the hard disk at different times.

21. An apparatus comprising:
means for receiving an instruction to read audio, video or audio/video data from an optical disk within an optical disk player, wherein the data is to be provided to an output means at a known playback rate;

means for reading the data from the optical disk at a rate that is greater than the known playback rate;

means for recording in an index database information parameters selected from a title of the optical disk, a title of a track of the data written to the hard disk, or combinations thereof;

means for comparing the information parameters of the data with information parameters of data previously recorded in the index;

means for determining whether the optical disk or the track has previously been written to the hard disk;

means for playing the data from the hard disk without re-reading the optical disk if the data has been previously written to the hard disk and turning off the optical disk player;

means for storing the data on a bard disk as the data is being read if the data was not previously stored on the hard disk;

means for providing the data to an output means at the known playback rate while the data is being stored;

means for turning off the optical disk player as soon as the data has been stored; and then means for continuing to provide the data to the output means at the known playback rate by retrieving the stored data.

22. The apparatus of claim 21, wherein the means for turning off the optical disk player includes means for turning off a spin motor within the optical disk player.

23. The apparatus of claim 21, wherein the data is selected from all the data on the optical disk or a track of the data on the optical disk, wherein the beginning of each track is identified in a table of contents for the optical disk.

24. The apparatus of claim 21, wherein the output means is selected from a speaker, a set of speakers, a video display or combinations thereof.

25. The apparatus of claim 21, further comprising:
means for converting the data to a different computer readable format before storing the data on the hard disk.

26. The apparatus of claim 25, wherein the format is selected from MP3, WMA, WAV, Ogg, VQF of AAC.

27. The apparatus of claim 25, wherein the format is any format that reduces the memory space required to store the data on the hard disk.

28. The apparatus of claim 21, further comprising:
means for recording information parameters in the index database selected from artist of the track, artist of the optical disk, date the file was last played from the hard disk, or combinations thereof; and
means for arranging data in the index database, wherein the data is arranged in groups selected from alphabetically by artist, alphabetically by titles, or by date the file was last accessed.

29. The apparatus of claim 21, further comprising:
means for searching the hard disk for presence of the data; and
means for playing the data from the hard disk without re-reading the optical disk.

30. The apparatus of claim 21, further comprising:
means for designating in an index database that a first file is to be permanently stored on the hard disk; and means for erasing automatically from the hard disk a second file not played for a designated set period of time and not designated in the index database that the second file is to be permanently stored on the hard disk, wherein the first and second files contain the data stored on the hard disk at different times.

* * * * *